US008725325B1

(12) United States Patent
Nishinaga et al.

(10) Patent No.: US 8,725,325 B1
(45) Date of Patent: May 13, 2014

(54) METHOD OF CONTROLLING EMERGENCY BRAKING IN FIXED GUIDEWAY TRANSPORTATION SYSTEM USING DYNAMIC BLOCK CONTROL (75) Inventors: Eugene Iwao Nishinaga, San Rafael, CA (US); Tod Mauerman, Long Beach, CA (US)

(73) Assignee: Cybertran International Inc., Richmond, CA (US)

( * ) Notice: Subject to any disclaimer, the term of this patent is extended or adjusted under 35 U.S.C. 154(b) by 0 days.

(21) Appl. No.: 13/316,402

(22) Filed: Dec. 9, 2011

Related U.S. Application Data

(63) Continuation-in-part of application No. 13/218,422, filed on Aug. 25, 2011, and a continuation-in-part of application No. 13/218,423, filed on Aug. 25, 2011, and a continuation-in-part of application No. 13/218,429, filed on Aug. 25, 2011, and a continuation-in-part of application No. 13/218,434, filed on Aug. 25, 2011, now Pat. No. 8,554,397.

(60) Provisional application No. 61/459,247, filed on Dec. 10, 2010.

(51) Int. Cl.
*G06F 7/00* (2006.01)
*B60T 8/34* (2006.01)
*B60T 8/58* (2006.01)
*B60T 13/74* (2006.01)
*B61L 3/00* (2006.01)
*B60T 13/66* (2006.01)

(52) U.S. Cl.
CPC ............... *B61L 3/008* (2013.01); *B60T 13/662* (2013.01); *B60T 8/34* (2013.01); *B60T 8/58* (2013.01)
USPC ............... 701/20; 701/70; 303/128; 303/132; 188/3 R (58) Field of Classification Search
USPC ............ 701/19, 20, 70; 303/3, 7, 15, 13, 2, 9, 303/122.09, 9.61, 22.6, 71, 20, 122.13, 89; 280/806; 104/282, 124, 285, 284, 290; 246/121, 182 B, 167 D, 182 C; 340/479, 340/436; 188/151 A, 170, 345, 38, 41; 105/30; 192/221.1
See application file for complete search history.

(56) References Cited

U.S. PATENT DOCUMENTS 4,107,253 A * 8/1978 Borg et al. ............... 701/20
4,166,599 A * 9/1979 Auer et al. ............... 701/117

(Continued)

OTHER PUBLICATIONS

Nishinaga, et al., "A Vehicle Collision Avoidance System Using Time Multiplexed Hexadecimal FSK", Boeing Aerospace Company, IEEE/Vehicular Technology Conference, vol. 33, 1983, pp. 171-182.

(Continued)

*Primary Examiner* — Helal A Algahaim
*Assistant Examiner* — Dale W Hilgendorf
(74) *Attorney, Agent, or Firm* — Pillsbury Winthrop Shaw Pittman LLP (57) ABSTRACT

The present invention relates to a fixed guideway transportation system that achieves a superior cost benefit ratio, is lower in net present cost and thus more easily justified for lower density corridors, and can provide passenger carrying capacities appropriate for higher density corridors serviced by mass rapid transit systems today. The invention provides an emergency braking control system and methodology that enables the implementation of related systems and methods that achieve safe headways at higher speeds than conventionally possible, while maintaining collision avoidance capabilities. In embodiments, vehicles are controlled from one or more stations with commands that are periodically sent from the station to the vehicle. For the control of emergency braking, this command contains a Safe to Proceed (STP) field that is intended and is required for the vehicle to withhold braking.

18 Claims, 5 Drawing Sheets

(56) References Cited

U.S. PATENT DOCUMENTS

| | | | |
|---|---|---|---|
| 4,494,717 A * | 1/1985 | Corrie et al. | 246/28 F |
| 4,742,460 A * | 5/1988 | Hollands | 701/19 |
| 4,926,354 A * | 5/1990 | Pattantyus | 363/98 |
| 5,364,047 A * | 11/1994 | Petit et al. | 246/122 R |
| 5,420,883 A * | 5/1995 | Swensen et al. | 375/138 |
| 6,135,396 A * | 10/2000 | Whitfield et al. | 246/182 R |
| 6,230,086 B1 * | 5/2001 | Oguma et al. | 701/19 |
| 6,631,873 B2 * | 10/2003 | Fisher | 246/182 B |
| 6,859,718 B2 * | 2/2005 | Fritz et al. | 701/36 |
| 7,433,354 B2 * | 10/2008 | Scherer et al. | 370/389 |
| 2008/0015745 A1 | 1/2008 | Gaegauf et al. | |
| 2008/0128563 A1 * | 6/2008 | Kumar et al. | 246/187 A |
| 2008/0154452 A1 | 6/2008 | Kapp et al. | |
| 2008/0167767 A1 | 7/2008 | Brooks et al. | |
| 2010/0114407 A1 | 5/2010 | Klooster et al. | |
| 2010/0131129 A1 * | 5/2010 | Daum et al. | 701/19 |
| 2010/0318247 A1 | 12/2010 | Kumar | |
| 2010/0319565 A1 | 12/2010 | Mobasher | |

OTHER PUBLICATIONS

Burt, HG.P., et al., "Microprocessor Control of Wheel Slip," IEEE, 1985, pp. 19-28.

* cited by examiner

METHOD OF CONTROLLING EMERGENCY BRAKING IN FIXED GUIDEWAY TRANSPORTATION SYSTEM USING DYNAMIC BLOCK CONTROL

CROSS-REFERENCE TO RELATED APPLICATIONS

The present application is a continuation-in-part of U.S. patent application Ser. No. 13/218,422, filed Aug. 25, 2011. The present application is also a continuation-in-part of U.S. patent application Ser. No. 13/218,423, filed Aug. 25, 2011. The present application is also a continuation-in-part of U.S. patent application Ser. No. 13/218,429, filed Aug. 25, 2011. The present application is also a continuation-in-part of U.S. patent application Ser. No. 13/218,434, filed Aug. 25, 2011. The present application also claims priority to U.S. Provisional Application No. 61/459,247, filed Dec. 10, 2010. The contents of all such applications are incorporated herein by reference in their entirety.

FIELD OF THE INVENTION

The present invention relates to fixed guideway transportation systems, and more particularly to methods and systems for controlling emergency braking for use in such systems employing dynamic block control for improved headways at high speeds.

BACKGROUND OF THE INVENTION

Modern mass rapid transit rail systems are very effective carriers of people. They are generally grade separated systems to enable vehicles to operate unaffected by automobile traffic, and thereby are able to achieve traffic densities otherwise unachievable. They are, however, very expensive. A typical, but conservative order of magnitude system capital cost for a system is approximately $100 million per bi-directional track mile of system, making it difficult for all but the largest and/or most affluent communities and cities to justify and/or afford the cost of new construction. This limitation has the effect of constraining the reach of these systems, and thus limiting the convenience to the users who can only ride the systems to the few locations to which guideway has been constructed. This results in a classic case of Catch 22. The high cost of systems requires a high ridership to justify the cost. However, high guideway costs limit construction and thus the reach of fixed guideway systems. This limits convenience to the riders, making it difficult to achieve the high ridership needed to justify the high cost.

Figure 1:
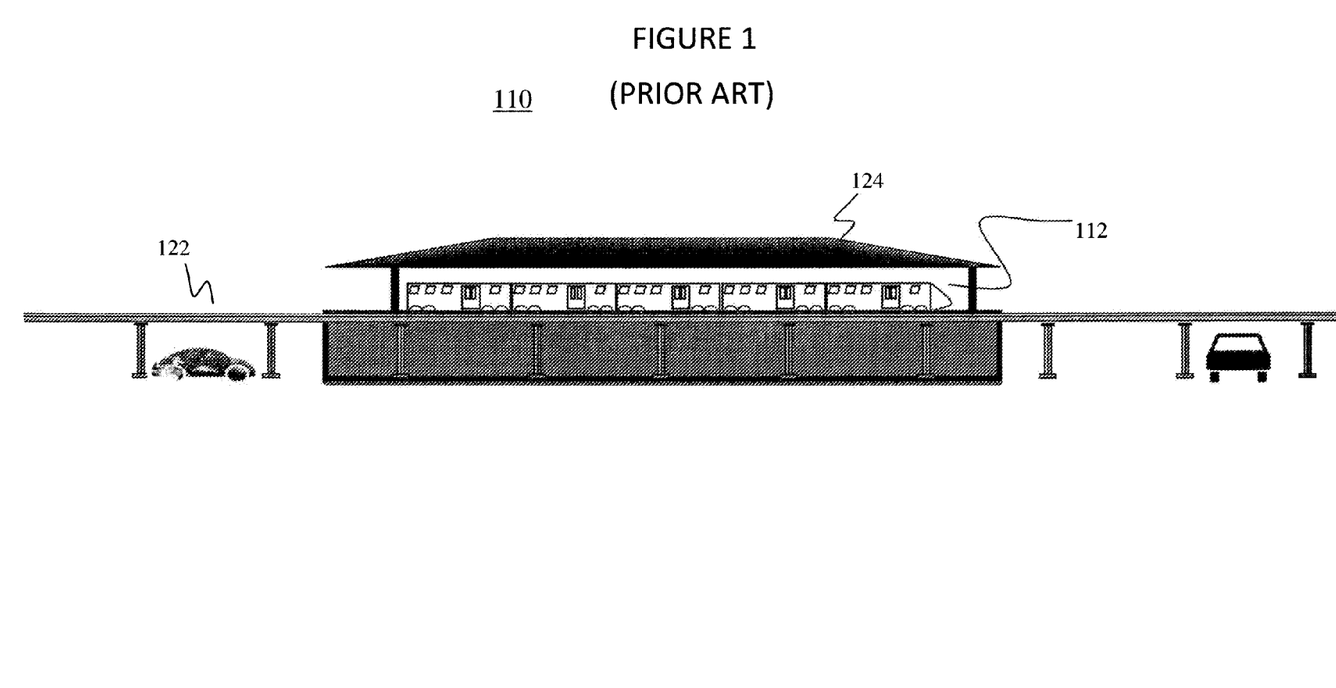
FIG. 1 illustrates a conventional mass transit system.

Conventional mass rapid transit rail technology attempts to improve the ratio of benefits per unit cost by focusing on serving the commuting public. This means building systems to achieve very high passenger capacities to major employment centers. An example conventional system is shown in FIG. 1. As shown, conventional systems 110 achieve high capacities by building heavy infrastructure and operating long heavy trains 112 that typically carry a large number of riders to the few large employment centers that they can most effectively service, while bypassing smaller towns or communities. This, however, requires very costly guideway 122 and station structures 124, which limits the system's reach and thus convenience for the users, especially for those who want to travel to the generally more widely distributed retail, residential, or recreational destinations.

With guideway 122 and station structures 124 that must be built to handle long heavy trains 112 to support demand during commute hours, the result is an expensive but marginally justifiable solution for commute hour travel which is far too expensive to justify for other periods of the day and other destinations.

Other existing transportation systems that aim to be less expensive to build and operate include automated people mover (APM) systems, such as those operating in many modern airports and some cities. These systems are low speed/low capacity systems that operate driverless vehicles at speeds in the range of 25 to 30 mph and achieve line capacities in the range of 2,000 to 3,000 passengers per hour per direction. Given the limited speed and capacity of these systems, even with the somewhat lower cost of construction due to the use of smaller vehicles, the benefit per cost is still poor. Furthermore, with the lower speeds and line capacities, these systems are limited in utility to local service routes.

Another type of transportation system that has been discussed is called "personal rapid transit" (PRT). PRT's differ from the more common APM systems in that these systems are built with offline stations which allow higher traffic densities to be achieved. Typically these systems operate driverless cars that seat four to six people and can provide service on a personal demand-driven basis. However, with the very small cars, high speeds are difficult to achieve and line capacities are severely restricted. There is one PRT that is operating at West Virginia University, the Morgantown PRT, which is an 8.2 mile long system having cars that seat 20 people. With a claim of 15 second headways, a line capacity of 4,800 passengers per hour per direction can be achieved. With rubber-tired vehicles, however, the top speed of the system is 30 mph thus limiting its applicability to low speed local service lines.

Co-pending application Ser. No. 13/218,422, the contents of which are incorporated by reference in their entirety, dramatically advanced the state of the art by providing a fixed guideway transportation system that can overcome many of the above and other challenges of the prior art. For example, the system of the co-pending application includes driverless vehicles carrying 10 to 30 persons designed for optimal ratio of benefits per cost. However, certain challenges remain.

For example, in order to cost effectively build and operate a system that operates smaller vehicles such as those contemplated by the co-pending application, yet achieves line capacities that justify the cost of constructing track infrastructures, the density of traffic that can be achieved needs to be sufficiently high. That means that safe operating headways must be made smaller than those achievable with conventional control systems that represent today's state of the art. Furthermore, these safe operating headways should be achieved at mass rapid transit speeds (at least 60 mph). This cannot be achieved with current systems.

Safe operation further requires that vehicles must always be able to stop before arriving at obstacles on the track. With all track geometries (i.e. grade, track curvature) being equal, the greatest restriction will occur where there are fixed obstacles (i.e. zero speed obstacles) in the path of the vehicle. Therefore, in order to achieve high traffic densities, it is desirable to eliminate the existence of fixed location obstacles on the track, such as switch points between tracks.

Relatedly, since a collision between two vehicles is a life-threatening event, control functions that prevent collisions are critical to safety. In the rail industry, control that is critical to safety must be designed and implemented to a standard commonly referred to as "vital." In recent years achieving vital status has required an analytical demonstration of a Mean Time Between Unsafe Event or Hazard (MTBH) of $10^9$ hours or greater. Accordingly, any methodology aimed at increasing traffic density by removing fixed obstacles such as track switches should include collision protection satisfying this standard.

SUMMARY OF THE INVENTION

The present invention relates generally to ground transportation systems, and more particularly to a fixed guideway transportation system that achieves a superior cost benefit ratio, is lower in net present cost and thus more easily justified for lower density corridors, and can provide passenger carrying capacities appropriate for higher density corridors serviced by mass rapid transit systems today. According to certain aspects, the present invention provides an emergency braking control system and methodology that enables the implementation of related systems and methods that achieve safe headways at higher speeds than conventionally possible, while maintaining collision avoidance capabilities that support necessary MTBH criteria. In embodiments, vehicles are controlled from one or more stations with commands that are periodically sent from the station to the vehicle. For the control of emergency braking, this command contains a Safe to Proceed (STP) field that is intended and is required for the vehicle to withhold braking. This STP field must be received by the vehicle at a predetermined rate, otherwise the vehicle system is designed to disable the ability to withhold emergency braking. According to further aspects, the invention provides systems and methods that assure that the STP is not falsely generated at the station, falsely communicated by the communication medium, or falsely interpreted by the vehicle.

In accordance with these and other aspects, an apparatus for braking a vehicle according to embodiments of the invention includes an emergency braking system that is configured to apply an emergency braking force that is capable of bringing the vehicle to a complete stop at least at a substantially predetermined rate and with a predetermined degree of safety; and control circuitry on the vehicle for generating a withhold signal, wherein the control circuitry is configured to generate the withhold signal unless a corresponding safe signal is not correctly received from an external source over a predetermined amount of time, and wherein the emergency braking system is configured to apply the emergency braking force whenever the withhold signal is not generated.

In further accordance with these and other aspects, a method for controlling motion of a vehicle according to embodiments of the invention includes preparing an emergency braking system to apply an emergency braking force that is capable of bringing the vehicle to a complete stop at least at a substantially predetermined rate and with a predetermined degree of safety; generating a withhold signal at the vehicle unless a corresponding safe signal is not correctly received from an external source over a predetermined amount of time; and causing the emergency braking system to apply the emergency braking force whenever the withhold signal is not generated.

In still further accordance with these and other aspects, a method for controlling motion of a vehicle according to embodiments of the invention includes configuring vital logic to produce a combined signal that comprises a safe command combined with an error code; transmitting the combined signal to the vehicle; configuring non-vital logic in the vehicle to extract the safe command from the combined signal and verify the combined signal using the error code; and preventing the application of emergency braking at the vehicle if the safe command is correctly extracted and the combined signal is correctly verified.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein.

Moreover, applicants do not intend for any term in the specification or claims to be ascribed an uncommon or special meaning unless explicitly set forth as such. Further, the present invention encompasses present and future known equivalents to the known components referred to herein by way of illustration.

According to certain aspects, the invention of the co-pending application enables the construction of rail lines that: 1. achieve a superior amount of benefits per cost; 2. are lower in cost and thus more easily justified for lower density corridors; and 3. can provide passenger carrying capacities appropriate for higher density corridors serviced by mass rapid transit systems today.

In certain embodiments, these objectives are met by utilizing smaller vehicles that can operate on a less expensive infrastructure. Using certain methods according to the co-pending application, the costs of fixed guideway mass rapid transit systems are reduced, allowing more destinations to be accessed. Also, with certain methods according to the co-pending application, the same structures appropriate for low ridership corridors and/or service hours can be used to achieve passenger carrying capacities needed for the high capacity corridors served today by modern mass rapid transit systems.

According to further aspects, the invention of the co-pending application improves the amount of benefits per cost of rail transit by reducing the cost to levels more justifiable for low density corridors. To be meaningful, certain methods according to the co-pending application achieve improved benefits per cost in a holistic manner, in other words, by reducing the net cost of ownership which includes not only the cost of equipment but also the net cost of operating and maintaining the system.

Although the principles of the inventions of the co-pending application and the present application will be explained in connection with applications to conventional diesel and/or electrified rail systems, the invention is not limited to these types of systems. For example, the principles of the invention can be extended to conventional and other vehicle technologies that do not rely on steel wheels rolling on steel rail.

According to certain aspects, the present invention further improves upon the invention of the co-pending application by providing a method for assuring the application of emergency braking when system conditions require braking for reasons of safety and can be used together with systems and methods for achieving improved headways between moving vehicles.

Figure 2:
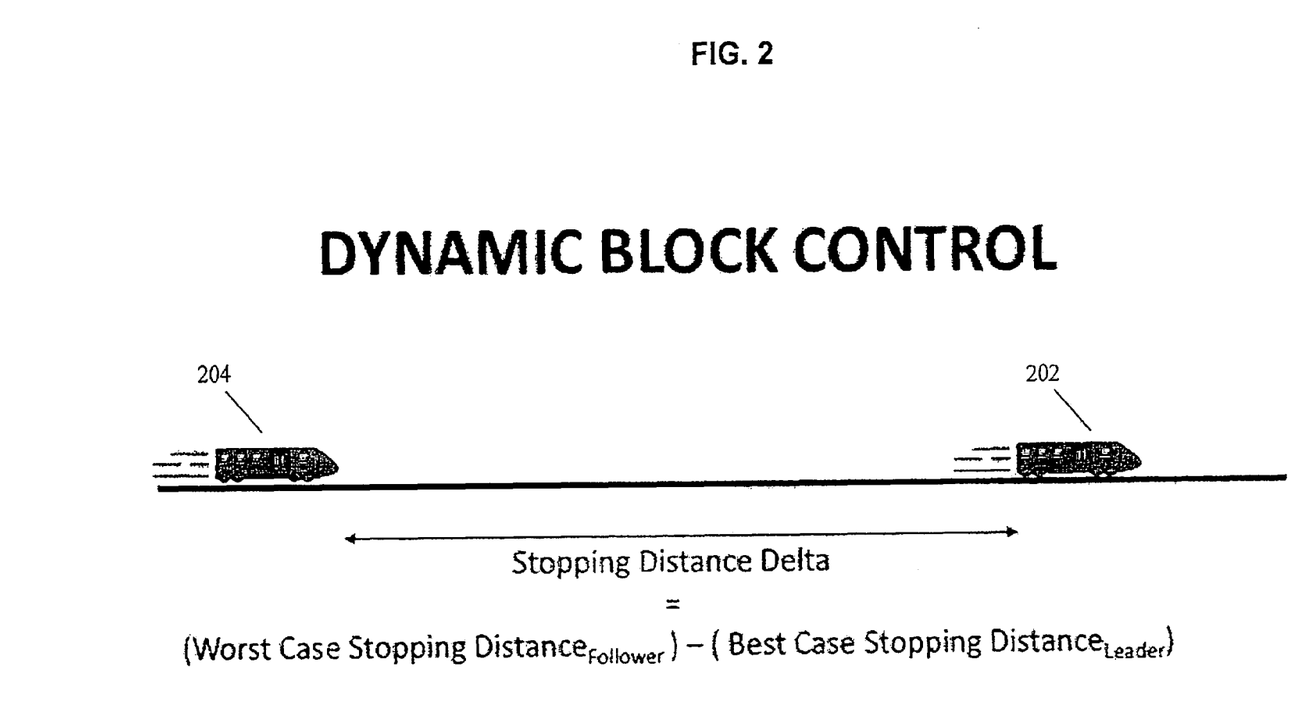
FIG. 2 illustrates an example method of providing dynamic block control in a fixed guideway transportation system according to aspects of the invention.

According to certain aspects, the present invention builds upon and provides enabling technology for implementing a dynamic block control system as described in co-pending application Ser. No. 13/218,429. A system and method described in that application achieves higher traffic densities by using a communication based train control system that takes into consideration the dynamic state of all vehicles when determining a safe separation distance between them. For example, as shown in FIG. 2, the system and method of the co-pending application constantly determines a stopping distance delta between a leading 202 and following vehicle 204 that considers the worst case stopping distance of the following vehicle 204 and the best case stopping distance of the leading vehicle 202. According to further aspects, the stopping distances of the vehicles 202, 204 can both be computed based on a targeted braking rate achieved with methods and devices disclosed and described in co-pending application Ser. No. 13/316,398. As a point of clarification, it is noted that a functional objective of the collision avoidance function for which the invention provides support is the prevention of collisions between vehicles. Such potential collisions can result from any or all of the following causes:

(1) flaws in the vehicle control logic that put two or more cars in potentially hazardous situations
(2) vehicle behavior that is not the behavior intended by the control logic
(3) loss of communication between the station and vehicle
(4) corrupted communication between the station and vehicle
(5) interference from hostile or otherwise unintended sources Also as another point of clarification, the example application described herein is the safety critical control of vehicle motion. The principles behind this described example, however, can be used equally effectively for the communication, reception, and control of vehicle doors, vehicle based switching, and any other vehicle functions, if any, that require safety critical enabling of vehicle functions. In the example application to follow, the permissive command to the vehicle is referred to as a Safe to Proceed (STP) command, but for door control, this would be replaced and referred to as a Safe To Open (STO) command and for switching would be a Safe to Switch (STS) command. Accordingly, aspects of the invention are not limited to the described example application of emergency braking.

According to still further aspects, the present invention builds upon and provides enabling technology for implementing a collision avoidance system and method as described in co-pending application Ser. No. 13/218,431. A system and method described in that application achieves improved headways even at high speeds by periodically determining whether there are any safety violations in the system, and withholding transmission of a safety signal to certain vehicles in the system if there is a violation. As in the previous system, the periodic determination of safety violations can assume a targeted braking rate achieved with methods and devices disclosed and described in co-pending application Ser. No. 13/316,398.

In embodiments of the present invention, which can implement the system and method of the co-pending application Ser. No. 13/218,434, vehicles are controlled from one or more stations with commands that are sent from the station to the vehicle and refreshed every $t_{frame}$ seconds. For the control of emergency braking, this command contains a Safe to Proceed (STP) field that is intended and is required for the vehicle to withhold braking. This STP command must be received by the vehicle at least once every $2 \times t_{frame}$, and lacking this, the vehicle system is designed to lose its ability to withhold emergency braking. In other words, if the STP is lost for a period slightly greater than n consecutive periods of $t_{frame}$, emergency braking will be initiated. For embodiments of the invention, $t_{frame}$ is 500 ms and n=2, the withholding of emergency braking will not be possible when the STP is not received on the vehicle for a period slightly longer than 1000 ms, for example 1100 ms.

Given the above, the ability to assure that the STP will not be falsely communicated to the vehicle or assumed to be present on the vehicle becomes important. The system should therefore protect against the STP being falsely generated in the station, falsely communicated by the communication medium, or falsely interpreted by the vehicle. This protection should be extremely robust and should be demonstrated to have achieved a reliability that supports the MTBH criteria for the system.

One example basic "mechanism" that ensures that leading and trailing vehicles will always brake in emergency situations to avoid collisions is illustrated in connection with FIG. 3, and further details of an example methodology and device from which this mechanism can be implemented are described in more detail below.

One system and method for assuring vehicles brake as required to ensure collision prevention that can be employed in the present invention is configured as follows. Note that in this description, n will be assumed to be 2 and $t_{frame}$ will be assumed to be 500 ms. However, in practice, n can be any integer value and $t_{frame}$ can be assigned any time duration as dictated by the particular system performance sought and the particular capabilities of the communication system used, for example.

1. Design the vehicle borne controller (described in more detail below) to require the STP indication at least every other frame (Frame=500 ms in one example embodiment) to withhold emergency braking. If the STP is missed for a period greater than 1100 ms, the vehicle borne controller will cease withholding emergency braking and the vehicle will initiate emergency braking.

2. Also design the vehicle borne controller to respond back to the station with an "STP RECEIVED" report every 500 ms. Note that the STP command sent to the vehicle can, although not necessarily, be sent with a unique identifier of which there may be a multiplicity of valid identifiers. In other words the STP command can have two separate bit fields, one that identifies the command as a STP command and a second that uniquely identifies the command. With this implementation, when the vehicle responds back to the station with a STP RECEIVED report, it will uniquely identify precisely which STP command was received and thus provide the station with knowledge of when the vehicle last received the STP command.

3. Design the collision avoidance logic to terminate transmission of the STP command to a vehicle if the STP command has been lost from the vehicle traveling in front of the vehicle and the vehicle to vehicle separation is less than a safe separation distance. It is important to note here that the safe separation distance is the delta between the most pessimistic or longest braking distance of the following car and the most optimistic or shortest braking distance of the leading car. Since the equipment on the vehicle can be designed to guarantee activation of emergency braking when the STP is lost but it cannot at the same time be designed to guarantee non-activation of the emergency brake when the STP has not been withheld, the calculation of the braking distance of the leading car will always assume that it is already in braking. Since this is implemented in a vital computer in control system 302, it is assured that processor error will not result in an anomalous transmission of the STP to a trailing vehicle.

Figure 3:
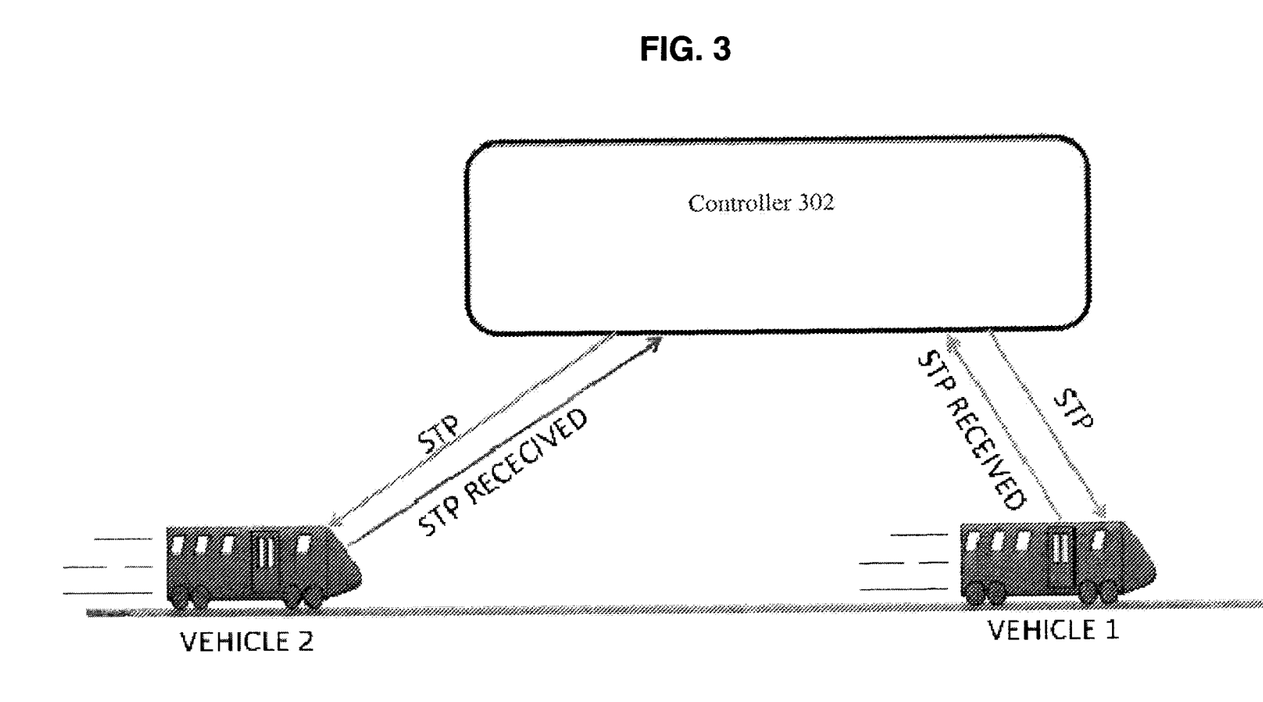
FIG. 3 illustrates an overall methodology of providing collision avoidance functionality using a STP signal in a fixed guideway transportation system according to aspects of the invention.

With the above implementation, if communication is lost to both Vehicles 1 and 2 shown in FIG. 3, both will initiate emergency braking and will both brake to a stop. Since the two vehicles will have been separated by at least the safe separation distance, and the two vehicles will brake to a stop at nearly the same rate and will not come into contact with each other. If communication is lost to only the leading vehicle the leading vehicle will emergency brake because it has lost the STP, but the following vehicle will also be made to brake because the STP RECEIVED report from the leading car will be lost by the control system 302 which will cause it to withhold the STP from the trailing vehicle as well. Again with both vehicles braking at nearly the same rate, the two vehicles will not come into contact with each other. In the event communication is lost to only the trailing vehicle, only the trailing vehicle will emergency brake which is safe.

An example system of station logic and vehicle logic that can implement the above overall methodology is further described in connection with FIG. 4.

Figure 4:
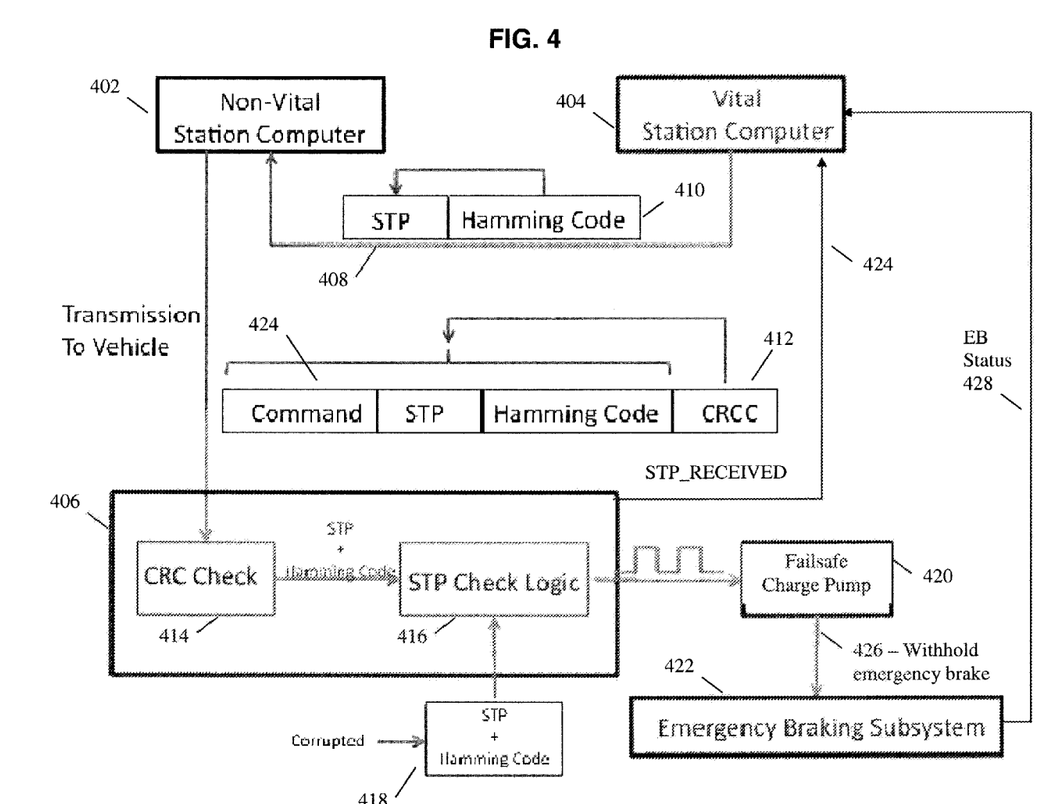
FIG. 4 is a block diagram illustrating components and functionality for reliably generating, transmitting, receiving and interpreting a STP signal that controls emergency braking in a vehicle according to embodiments of the invention.

As shown in FIG. 4, station-based control system 302 is implemented in this example using a non-vital computer 402 and a vital computer 404, while vehicle-based controller 406 is implemented using non-vital components. Aspects of implementing control systems using vital and non-vital logic are described in more detail in co-pending application Ser. No. 13/218,423 (CTI-002). As set forth in that application, non-vital logic such as computer 402 and controller 406 can be implemented with off-the-shelf commercial hardware (e.g. personal computer and/or server computer hardware and software) with no necessary attention to safety or failure prevention. On the other hand, vital logic such as computer 404 is critical to safety and requires vital processing hardware and rigorously validated and verified software as is understood by those skilled in the art. Meanwhile, in this example, non-vital control circuitry in the vehicle includes controller 406, circuit 420, and corruption signal generator 418, to be described in more detail below.

It should be noted that, in this example implementation, the monitoring of the current state of the system (i.e. vehicle position and speed) is performed by the vital station computer 404. This is a special processing platform that has been specifically designed to generate unusable outputs whenever processing failures occur. Thus for the sake of this description, it can be assumed that the vital station computer 404 cannot falsely generate the STP when it is unsafe for the vehicle to continue without initiating emergency braking. On the vehicle, the only function that is critical to safety is the correct detection of the reception of the STP command. Since absence of this command from the station must under all circumstances initiate emergency braking, falsely detecting the STP command when it has not been sent from the station is an unsafe failure and the system implementation must make such faulty detection sufficiently unlikely to occur such that the system MTBH criteria can be met.

Next, note that in embodiments such as FIG. 4, the STP is an n-bit code (n=4 for this example) that is constant (i.e. unchanging with time), and known to the vehicle-borne controller 406. In the Vital Station Computer 404, the STP code 408 is combined with a m bit hamming code 410 (m=3 for this example) which provides parity checking with sufficient redundancy to ensure that all single and double bit errors in transmission and/or reception are detected. However, because the parity checking can still be defeated by certain combinations of bit failure patterns, a second level of protection is included in the command generation and communication process. This is shown in the diagram as a Cyclic Redundancy Check (CRC). (Note: Although reference here is made to the Hamming Code, there are a multiplicity of parity checking schemes that can be used, the selection of which is left to the designer.)

As depicted, in the station a Cyclic Redundancy Check Code (CRCC) 412 is generated covering the entire message (e.g. commands+STP+hamming code). This process requires the use of a pre-selected code generation polynomial G(x), the selection of which defines the strength/characteristic of the error detection capability of the CRCC. The CRCC thus generated is then appended to the command, STP, and Hamming Code combination before transmission to the vehicle. This CRCC is generated using a CRC Key, that is available in the station and on the vehicle and is necessary both for code generation and proper message interpretation.

As still further shown in FIG. 4, a non-vital command field 424 can be included in the message transmitted from station controller 302 to vehicle-borne controller 406. These commands are not critical to safety but are nevertheless needed for the control of a driverless vehicle, as will be appreciated by those skilled in the art. Examples of the types of commands in this command field are described in co-pending application Ser. No. 13/323,768. Controller 406 and/or other controllers in the vehicle can further include logic and components for interpreting these commands and actuating the appropriate vehicle controls and components based thereon. Various known and proprietary techniques can be used to implements such logic and components, and so details thereof are not included here for sake of clarity of the invention.

On the vehicle, the CRC error detection algorithm 414 in controller 406 is used to detect transmission errors. This requires knowledge on the vehicle of the generator polynomial, G(x), used by the station. Error combinations in the STP command that go undetected by the CRC process are then subject to a second layer of error detection using the Hamming Code. Since for corruption to be undetected, the corruption must be missed by both processes, it can be shown by those skilled in the art that for a STP command to be falsely communicated to the vehicle will require an extremely rare combination of errors.

If the total command message passes the CRC check, the STP and Hamming Code is passed on to the STP Check Logic 416 for checking. Upon receipt of the STP and Hamming Code from block 414, the STP Check Logic 416 checks for errors using the Hamming Code and if the comparison is successful, logic 416 further determines whether the received STP code contains the predetermined STP command bits. If so Logic 416 outputs a signal representing a successfully received STP indicator. As a separate function from the above, the vehicle-borne controller echoes back the received STP code and its associated Hamming Code in a report 424 to the Vital Station computer 404. CRC codes will also accompany the transmission of reports back to the station.

According to aspects of the invention, signal generator 418 and circuit 420 are used to ensure that failures of the STP Check Logic 416, will not result in an unintended withholding of emergency braking, a potentially unsafe failure. Without these functional blocks, if logic 416 were to fail and incorrectly determine that the STP had been received when in fact it had not, an improper and potentially unsafe withholding of emergency braking will result. In embodiments, this concern is addressed by generator 418, which periodically sends a signal to controller 406 and logic 416 with data known to contain errors or a non-permissive (i.e. not safe to proceed) command. In this described embodiment, this wrong data 418 is sent at the same rate as the frame rate for the STP signal (every 500 ms in this example) but offset in time by 250 ms and alternating between data that contains bits that fail the parity check and data that passes the parity checking but contains a non-permissive command. The output signal of logic 416, if it is executing properly, will thus alternate between indicating detection and non-detection of the STP. In embodiments, if the wrong data 418 is provided correctly, and if a logic "high" signal output from logic 416 indicates a successful STP signal received, while a logic "low" signal indicates no STP signal received, the output signal from logic 416 will be substantially a square wave that alternates at a rate of 250 ms, with a duty cycle between "high" and "low" states of about 50%.

This signal output from block 416 is then fed to a device which can be implemented as a failsafe charge pump circuit 420. Circuit 420 is designed to require the square wave signal described above (proper frequency and duty cycle) in order to be able to generate an output 426 to be delivered to the Emergency Braking Subsystem 422, to withhold emergency braking. Furthermore, the circuit is designed to be unable to output a permissive output (i.e. an output that withholds braking) in the presence of any component failure in the circuit. The charge pump circuit is included here because if the signal that withholds emergency braking 426 is required to have a voltage that is higher than the maximum voltage available to the equipment, then there are known design techniques that can achieve the criteria described above.

Charge pump circuit 420 can be implemented according to any one of a number of those known in the art, as should be apparent from the examples provided herein, and so details thereof will be omitted here for sake of clarity of the invention.

An example braking system 422 that can be used in conjunction with the present invention is described in more detail in co-pending application Ser. No. 13/316,398. In order to assure that the braking system that receives the signal to withhold emergency braking does not fail to a state that causes it to not initiate emergency braking when the withhold signal is lost, the braking system should be periodically tested. One approach for achieving this periodic testing would be to have the braking system report its Brake On/Off status 428 to the station and then terminate the STP command to the vehicle momentarily whenever the vehicle is stopped in a station platform. If the braking unit is functioning correctly, the station should observe a Brake ON report during every station stop. Detecting and responding to improper behavior by the vehicle can be made the responsibility of the Vital Station Computer, that by design, can be relied upon to react correctly at all times.

Another embodiment of the functionality described above is to provide the STP Detected/Non Detected indication in the form of data on the communication bus to the quad-redundant braking units described in detail in co-pending application Ser. No. 13/316,398. Since the braking units are quad-redundant and safe vehicle response is assured as long as two of the four units are functioning, three failures would have to occur within a short window of time for the system to enter an unsafe state. Using periodic testing of the braking function described above, the probability of three concurrent failures can be made sufficiently low as to meet the MTBH criteria.

Figure 5:
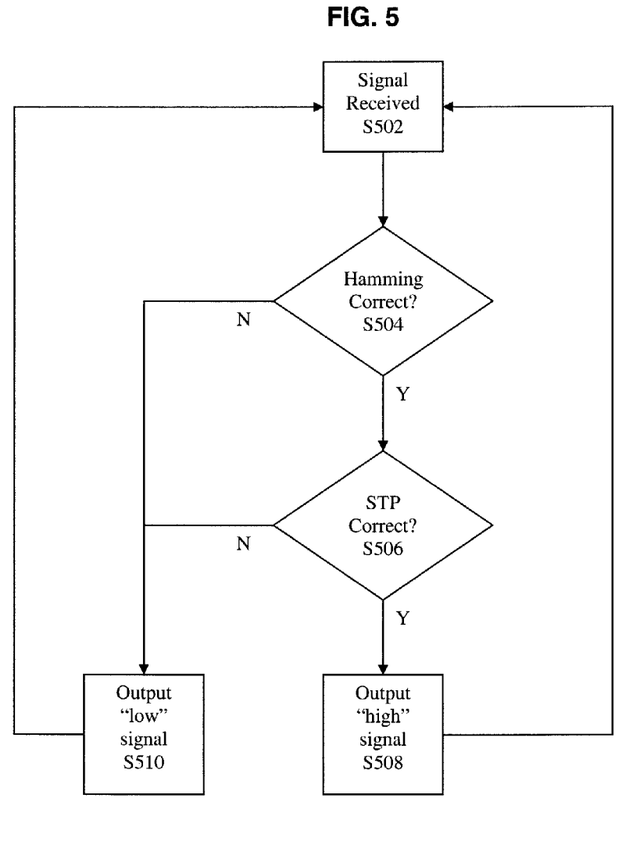
FIG. 5 is a flowchart illustrating an example methodology used in a vehicle to verify and interpret an input STP signal and to reliably generate a corresponding output signal used to control emergency braking in the vehicle according to aspects of the invention.

FIG. 5 is a flowchart illustrating an example methodology that can be implemented by logic block 416.

As shown in FIG. 5, logic block 416 is responsive to a signal received in step S502. As discussed above, the signal can be an output of block 414, or it can be a corrupted signal from block 418.

When any input signal is received, block 416 checks the bits in the signal using the received Hamming code and the known Hamming code algorithm used by computer 404. If this code is correct (as determined in step S504), processing advances to step S506. Otherwise, processing advances to block S510, where the output of block 416 is driven to a logic "low" level.

In step S506, block 416 further determines if the STP code bits in the input signal match the known STP code bits. If so, processing advances to step S508 where the output of block 416 is driven to a logic "high" level. Otherwise, processing proceeds to step S510, where the output of block 416 is driven to a logic "low" level.

As can be seen, processing returns from either step S508 or step S510 to step S502. Accordingly, until another signal is received, the output of block 416 is maintained at the last level output by block 416. In this manner, and in conjunction with the design of circuit 420, as long as the proper sequence and timing of "low" and "high" outputs from block 416 are continuously generated, a signal causing emergency braking to be withheld will be generated by circuit 420 to braking subsystem 422. Otherwise, emergency braking will be initiated by the vehicle.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. An apparatus for braking a fixed guideway vehicle, comprising:

an emergency braking system that is configured to apply an emergency braking force that is capable of bringing the vehicle to a complete stop at least at a substantially predetermined rate and with a predetermined degree of safety; and control circuitry on the vehicle for generating a withhold signal, wherein the control circuitry is configured to generate the withhold signal unless a predetermined safe command is not correctly received from an external source over a predetermined amount of time, wherein the external source is external to the vehicle in which the control circuitry is located, wherein the control circuitry includes:

logic that receives a signal from the external source and extracts a command therefrom, the logic further generating a periodic signal only if the extracted command matches the predetermined safe command, the periodic signal generated by the logic having one or both of a predetermined frequency and a predetermined duty cycle; and a device that generates the withhold signal only when the periodic signal generated by the logic has one or both of the predetermined frequency and the predetermined duty cycle for the predetermined amount of time, and wherein the emergency braking system is configured to apply the emergency braking force whenever the withhold signal is not generated.

2. The apparatus according to claim 1, wherein the device comprises a charge pump circuit that is configured to determine whether the periodic signal has one or both of the predetermined frequency and the predetermined duty cycle for the predetermined amount of time based on voltages corresponding to high and low states of the periodic signal.

3. The apparatus according to claim 1, wherein the signal is repeatedly transmitted from the external source to the vehicle once every frame interval during safe conditions, the frame interval being based on the predetermined frequency.

4. The apparatus according to claim 1, further comprising a corrupt signal generator that generates a corrupt command at the predetermined frequency, wherein the logic has command check logic that receives the command extracted from the signal from the external source and the corrupt command from the corrupt signal generator and generates the periodic signal based on a comparison of the extracted command and the corrupt command with the predetermined safe command.

5. The apparatus according to claim 4, wherein the command check logic generates a square wave signal by alternately comparing the corrupt command and the extracted command with the predetermined safe command, the square wave signal having high and low states corresponding to successful and unsuccessful comparisons, respectively.

6. The apparatus according to claim 4, wherein the signal is repeatedly transmitted from the external source to the vehicle once every frame interval during safe conditions, the frame interval being based on the predetermined frequency, and wherein the predetermined duty cycle is based on an offset between the repeated transmissions and the generation of the corrupt command.

7. The apparatus according to claim 4, wherein the logic further includes:

redundancy code error check logic that generates the extracted code and an error code based on the contents of the signal and outputs the extracted command and extracted command code if the error code is correct, wherein the command check logic further generates the periodic signal based on the extracted command and extracted command code.

8. The apparatus according to claim 7, wherein the redundancy code error check logic comprises a cyclic redundancy code check.

9. The apparatus according to claim 7, wherein the extracted command code comprises a parity check code.

10. The apparatus according to claim 9, wherein the extracted command code comprises a Hamming code.

11. A method for controlling motion of a fixed guideway vehicle, comprising:

preparing an emergency braking system to apply an emergency braking force that is capable of bringing the vehicle to a complete stop at least at a substantially predetermined rate and with a predetermined degree of safety;

generating a withhold signal using control circuitry in the vehicle unless a predetermined safe command is not correctly received from an external source over a predetermined amount of time, wherein the external source is external to the vehicle in which the control circuitry is located, wherein the generating step includes:
receiving the signal from the external source;
extracting a command from the received signal;
comparing the extracted command to the predetermined safe command;
generating a periodic signal based on the results of the comparison, the generating including causing the periodic signal to have one or both of a predetermined frequency and a predetermined duty cycle; and
generating the withhold signal only when the periodic signal has one or both of the predetermined frequency and the predetermined duty cycle for the predetermined amount of time; and causing the emergency braking system to apply the emergency braking force whenever the withhold signal is not generated.

12. The method according to claim 11, wherein the signal is repeatedly transmitted from the external source to the vehicle once every frame interval during safe conditions, the frame interval being based on the predetermined frequency.

13. The method according to claim 11, further comprising:
generating a corrupt command at the predetermined frequency, wherein generating the periodic signal includes receiving the command extracted from the signal from the external source and the corrupt command and generating the periodic signal based on a comparison of the extracted command and the corrupt command with the predetermined safe command.

14. The method according to claim 13, wherein the periodic signal is a square wave signal that is generated by alternately comparing the corrupt command and the extracted command with the predetermined safe command, the square wave signal having high and low states corresponding to successful and unsuccessful comparisons, respectively.

15. The apparatus according to claim 13, wherein the signal is repeatedly transmitted from the external source to the vehicle once every frame interval during safe conditions, the frame interval being based on the predetermined frequency, and wherein the predetermined duty cycle is based on an offset between the repeated transmissions and the generation of the corrupt command.

16. The method according to claim 13, wherein the step of generating the periodic signal further includes:
generating a redundancy code based on the contents of the signal;
outputting the extracted command and an extracted command code if the redundancy code is correct;

wherein generating the periodic signal is further based on the extracted command code.

17. The method according to claim 16, wherein the redundancy code comprises a cyclic redundancy code.

18. The method according to claim 16, wherein the extracted command code comprises a parity check code.

* * * * *